United States Patent Office 3,017,651
Patented Jan. 23, 1962

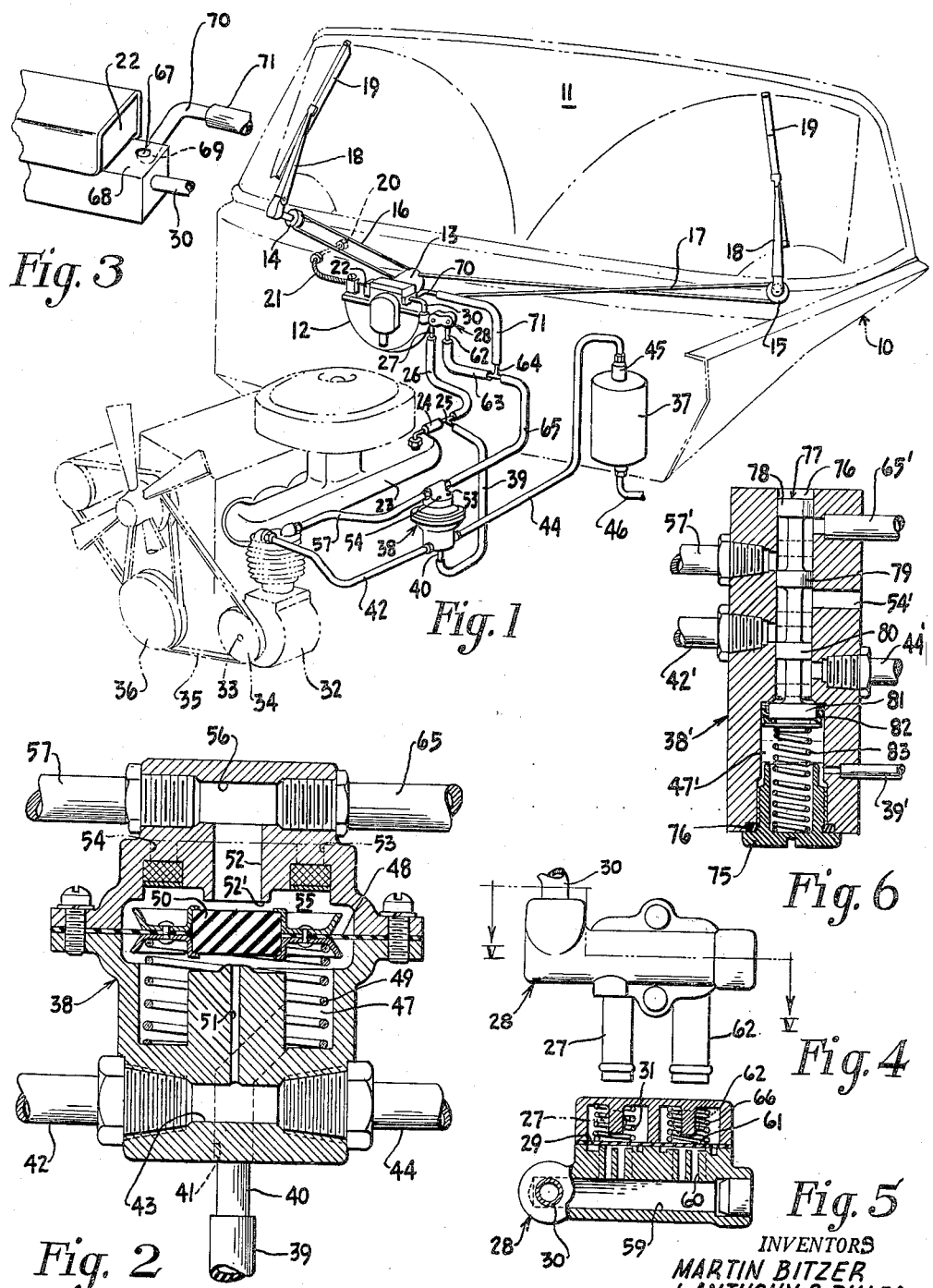

3,017,651
WINDSHIELD WIPER SYSTEM
Martin Bitzer, Kenmore, and Anthony R. D'Alba, Buffalo, N.Y., assignors to Trico Products Corporation, Buffalo, N.Y.
Filed Nov. 13, 1958, Ser. No. 773,618
13 Claims. (Cl. 15—250.12)

This invention relates to an improved windshield wiper system.

A windshield wiper system employing a fluid pressure motor actuated by engine intake manifold vacuum is well known. The advantages of this system are its relatively low cost; its ability to give years of trouble-free service without any maintenance requirement; and its characteristic of utilizing by-product power from the vehicle, namely, the suction created by the engine intake manifold, to produce motion to drive the windshield wipers without adding any appreciable load to existing power sources in the vehicle. However, the speed output of this system varies with the amount of vacuum produced in the engine intake manifold which unavoidably fluctuates with variations in operational conditions of the vehicle engine. A recent development in the automotive field, however, has been to provide a compressor within the vehicle for operating various accessories, such as air suspension. The present invention is concerned with selectively utilizing this compressor to cause the fluid pressure motor of a vacuum actuated wiper system to always operate above a predetermined minimum speed regardless of fluctuations in manifold vacuum.

It is accordingly one object of the present invention to provide a fluid pressure operated windshield wiper system in which the windshield wiper motor is always caused to operate above a predetermined minimum speed, either solely by engine intake manifold vacuum or by the vacuum produced in the intake side of a compressor when the manifold vacuum drops to predetermined value which would cause the motor to operate below a predetermined speed.

Another object of the present invention is to provide an automotive windshield cleaning system which is efficient in operation and economical to both manufacture and operate. Other objects and attendant advantages of the present invention will readily be perceived hereafter.

In accordance with the foregoing objects, the present invention relates to an improved windshield wiper system wherein a fluid pressure motor is normally driven by the engine intake manifold vacuum. During most conditions of vehicle operation, the manifold vacuum is within a first range of values which is sufficiently high to cause the motor to run above a predetermined minimum speed. However, when the manifold vacuum drops to a second range of values which is lower than the first range and therefore below the value necessary to operate the motor above the predetermined minimum speed, a control arrangement causes the intake side of a compressor mounted within the vehicle to be coupled to the wiper motor. The intake side of the compressor will supply vacuum in an amount required to cause the wiper motor to continue to operate above the predetermined minimum speed. Thus, during the major part of its operation, the motor is driven by the intake manifold vacuum, and it is only during the infrequent instances when the manifold vacuum drops that the compressor-induced vacuum is substituted for the manifold vacuum to thereby give a system which retains all of the above-mentioned advantageous features of the proved manifold vacuum actuated system, and, in addition, provides the additional advantage of always producing a desirable speed output in an economical manner. A further advantage of the present system is that the fluid pressure motor, which is ordinarily driven by manifold vacuum, can be driven above a predetermined minimum speed for prolonged periods of time when the manifold vacuum is low, as when the vehicle is accelerating for a long period. The present invention will be more fully understood when the following portions of the specification are read in conjunction with the accompanying drawings wherein:

FIG. 1 is a fragmentary perspective view of an automotive vehicle containing the improved wiper system;

FIG. 2 is a view, partially in cross-section, of the master control valve of the improved system;

FIG. 3 is a fragmentary perspective view of the relationship between the wiper motor slide valve and the valve seat with which it coacts;

FIG. 4 is an enlarged detail view of a valve structure which links the wiper motor to both the intake manifold and the compressor;

FIG. 5 is a view taken along line V—V of FIG. 4; and

FIG. 6 is an alternate embodiment of the valve of FIG. 2.

In FIG. 1, a portion of an automotive vehicle 10 is shown having a windshield 11 mounted thereon. A windshield wiper motor 12, which may be suitably mounted on the firewall (not numbered) of the vehicle, is adapted to cause oscillation of drum 13 which is linked to pulleys 14 and 15 by flexible cables 16 and 17, respectively. Pulleys 14 and 15 are, in turn, mounted on rockshafts (not numbered) journaled in the cowl of the vehicle, the rockshafts also mounting wiper arms 18 on which are mounted wiper blades 19 in any conventional manner. When it is desired to place motor 12 in operation to cause oscillation of wiper blades 19 across windshield 11, it is only necessary to manipulate control 20 on the vehicle dashboard to cause Bowden wire unit 21 operatively coupled thereto to move slide valve 22 to a position which permits vacuum to communicate with the wiper motor, as described hereafter. Motor 12 may be of any type which is operated by vacuum, such as described in Patent No. 2,803,225.

When the engine intake manifold vacuum is of a sufficient magnitude to cause motor 12 to operate above a predetermined minimum speed, engine intake manifold 23 will communciate with the motor 12 through conduit 24, T 25, conduit 26, nipple 27 of valve 28 (FIGS. 1, 4 and 5), flapper valve 29 of valve 28, and conduit 30 (FIGS. 1, 2, 4 and 5). A spring 31, which extends between valve 29 and a portion of the housing of valve 28, tends to bias valve 29 to a closed position. However, this spring permits valve 29 to open when the vacuum is of a sufficient magnitude to cause motor 12 to operate above a predetermined speed.

An air compressor 32 (FIG. 1) is suitably mounted in the engine compartment. The shaft 33 of the compressor has a pulley 34 mounted thereon which is driven by a belt 35 extending between it and a pulley 36 mounted on the engine crank shaft (not shown). Operatively interconnecting the compressor 32, the wiper motor 12, the engine intake manifold 23, and a compressed air tank 37 is a master control valve 38 (FIGS. 1 and 2) which causes the vacuum produced by the intake side of compressor 32 to operate motor 12 when the manifold vacuum drops sufficiently to cause the motor speed to fall below a predetermined value. A conduit 39 extends between T 25 and a nipple 40 in communication with duct 41 within valve 38 (FIGS. 1 and 2). The output side of compressor 32 is coupled to conduit 42 which is, in turn, coupled to valve 38. Conduit 42 communicates with conduit 43 within valve 38 which, in turn, communicates with conduit 44 (FIGS. 1 and 2) which is coupled to compressed air tank 37. A suitable check valve 45 prevents compressed air in tank 37 from bleeding back to the compressor 32. Another conduit 46, which is coupled to tank 37, leads to suitable accessories (not shown) which utilize compressed air.

When the manifold vacuum is sufficiently high to maintain the speed of motor 12 above a predetermined minimum value, the vacuum in conduit 39 will be in communication with chamber 47 within valve 38 through nipple 40 and bore 41. This will cause diaphragm 48, which is held between the upper and lower sections of the valve housing, to be pulled downwardly against the bias of spring 49. The valve 50, which is secured to diaphragm 48 by brackets (not numbered) attached to the diaphragm will, therefore, be pulled downwardly to perform a dual function. The first aspect of this dual function is to close the upper end of conduit 51 which leads to conduit 43 in valve 38 and thereby prevent compressed air from entering chamber 47. It will, of course, be appreciated that conduit 51 is of a suitable size differential relative to conduit 41 so that the downward force exerted on diaphragm 48 by manifold vacuum will be greater than the combined upward force exerted thereon by the air pressure in conduit 51 and by spring 49. The second aspect of the dual function of valve 50 is to open the end of conduit 52 in valve 38 when the vacuum in the engine intake manifold 23 is of sufficient magnitude to operate motor 12 above a predetermined minimum speed to thereby permit the air requirements for compressor 32 to be obtained through apertures 53 and 54 of valve 38, chamber 55, conduit 52 which is in communication with conduit 56 of valve 38, and conduit 57 (FIGS. 1 and 2) leading to the intake side of compressor 32.

There are times, however, when the manifold vacuum drops below a value which is necessary to maintain the speed of wiper motor 12 above a predetermined minimum speed. This situation is most common when the vehicle is accelerated. When this reduction of manifold vacuum is experienced, the compressor 32 provides the vacuum to continue driving motor 12 above the predetermined minimum speed in the following manner: The drop in manifold vacuum is communicated to a chamber 47 of valve 38 through conduit 24, T 25, conduit 39, nipple 40 and conduit 41. Since this vacuum is less than that required to maintain valve 50 on its seat obstructing the end of conduit 51, spring 49 will bias diaphragm 48 away from the end of conduit 51. This, in turn, will permit compressed air in conduit 43 of valve 38 to pass through conduit 51 into chamber 47. The upper surface of valve 50 will engage seat 52' surrounding the end of conduit 52. When this occurs, the communication between air vents 53 and 54 and conduit 52 through chamber 55 of valve 38 is disrupted. The air displacement requirements for compressor 32 are, therefore, obtained by causing evacuation of motor 12 into the intake side of compressor 32 through conduit 30 (FIGS. 1, 3, 4, and 5), conduits 59 and 60 in valve 28, flapper valve 61, nipple 62 (FIGS. 1, 4, and 5) of valve 28, conduit 63, T 64, conduit 65, conduit 56 of valve 38, and conduit 57 which leads to the intake side of compressor 32. The vacuum in conduit 56 will aid in maintaining valve 50 on its seat at the end of conduit 52. Furthermore, the movement of valve 50 from its position obstructing the end of conduit 51 to seat 52' is an extremely rapid type of snap action because of the application of both a more positive pressure below the valve and negative pressure above it during its upward movement. It will readily be appreciated that the vacuum produced by the intake side of compressor 32 may thus be utilized instead of the reduced manifold vacuum in engine intake manifold 23 to drive motor 12. Furthermore, since compressor 32 is always driven, the suction produced thereby can sustain operation of motor 12 for prolonged periods of vehicle acceleration.

It is to be noted at this point that flapper valve 61 of valve 28 is normally biased to a closed position by spring 66. Valve 61 is a one-way type of check valve which opens against the bias of spring 66 only when valve 50 of master control valve 38 is seated on seat 52'. When motor 12 is operating from engine intake manifold 23, the vacuum produced in the engine intake manifold is of a greater magnitude than the vacuum exerted by the suction side of compressor 32 on flapper valve 61 of valve 28. Therefore, the vacuum in conduit 59 of valve 58 in combination with the force of spring 66 biasing valve 61 will maintain flapper valve 61 closed to prevent cross-porting between valve 61 and valve 29. On the other hand, when the manifold vacuum drops so that the wiper motor 12 is driven from the intake side of compressor 32, flapper valve 29 will be closed because the vacuum in chamber 59 plus the force exerted by spring 31 on flapper valve 29 is greater than the manifold vacuum tending to keep valve 29 open. In this manner, also, cross-porting between valves 29 and 61 will be prevented.

It will be appreciated, however, that there are times when the compressed air tank 37 is full and cannot receive any more of the air which is compressed by compressor 32. It will further be appreciated that if compressor 32 cannot dispose of the air which it compresses, it cannot take in air and cannot provide vacuum for operation of motor 12. Therefore, the same master control valve 38 which causes the vacuum induced by compressor 32 to drive motor 12 also causes the air which is compressed in compressor 32 to be disposed of when tank 37 is full. This is achieved in the following manner: The compressed air produced by compressor 32 is discharged through conduit 42, (FIGS. 1 and 2). However, when master control valve 38 is in a condition to permit compressor 32 to provide the vacuum to operate motor 12, valve 50 is unseated from the terminal of conduit 51 within valve 38, as explained in detail above. Therefore, the air which is compressed by compressor 32 may pass through conduit 42, conduit 43 in valve 38, conduit 51 in communication with conduit 43, chamber 47, conduit 41 within valve 38, nipple 40, conduit 39, T 25, conduit 24, and then into an engine intake manifold 23. The dumping of the compressed air in the foregoing manner in no way detrimentally affects carburetion of the engine.

It will, of course, be appreciated that when the tank 37 does not contain a sufficient capacity of compressed air for operation of the automotive accessories, the foregoing problem does not exist and most of the compressed air is transmitted to tank 37 through conduit 42, conduit 43 in valve 38, conduit 44 and check valve 45. This is possible because the relative sizes of conduits 51 and 43 are such that only a small part of the compressed air is dumped into the intake manifold through the above described path when tank 37 does not contain a sufficient capacity of compressed air.

Provisions are also made for supplying the intake side of compressor 32 with air to be compressed when the wiper motor is in an "off" position and the engine intake manifold drops. More specifically, it will be appreciated that valve 50 within master control valve 38 blocks off atmospheric intake vents 53 and 54 when the engine intake manifold pressure falls below a given value, as explained in detail above. Therefore, if the motor 12 is "off" the air requirements for the compressor cannot be obtained through either the motor chamber or through apertures 53 and 54. However, air is provided to the compressor 32 regardless of the foregoing situation. As can be seen from FIG. 3, an aperture 67 is provided in motor valve seat 68. This aperture is in communication with conduit 69 in the valve seat which, in turn, communicates with nipple 70 (FIGS. 1 and 2). Nipple 70 is, in turn, coupled to conduit 71 which, in turn, is coupled to T 64. Then the motor 12 is in an "off" position, slide valve 22 will be in a position wherein it uncovers aperture 67 (FIG. 3). Therefore, when the vacuum in the engine intake manifold 23 causes valve 50 of master control valve 38 to seat against conduit 52, in the above described manner, to prevent air intake through vents 53 and 54, the air requirements for compressor 32 will be obtained through aperture 67 in slide valve seat 68, conduit 69, nipple 70, conduit 71, T 64, conduit 65, conduit 56 of master control valve 38, and conduit 57. It will readily be appreciated, however, that when the manifold vacuum is of a sufficiently high value, valve 50 of master control valve 38 will be pulled off of seat 52' within the valve to permit the air requirements for the compressor 32 to be obtained primarily through venting apertures 53 and 54.

In FIG. 6, an alternate embodiment 38' of the master control valve 38 of FIG. 2 is disclosed. This valve has five conduits coupled thereto, plus an air vent. The five conduits and the air vent of valve 38' correspond to the five conduits and the air vent of valve 38 of FIG. 2. Accordingly, these conduits will be designated by the primed numerals corresponding to the unprimed numerals depicting analogous conduits coupled to valve 38. More specifically, the conduits 39', 42', 44', 57', 65' and air vent 54' of valve 38' are analogous to conduits 39, 42, 44, 57, 65, and air vent 54 of valve 38, respectively.

Conduit 39' of valve 38' has one end thereof which is adapted to communicate with an engine intake manifold, and the other end thereof which is adapted to communicate wtih chamber 47' of valve 38'. A plug 75 is threaded into the housing portion of valve 38', and a seal 76 provides a fluid-tight connection therebetween. Mounted within the elongated bore 76 is a spool valve 77 having enlarged portions 78, 79, 80 and 81 thereon which divide bore 76 into three chambers.

In operation, when the manifold vacuum (which is sensed in chamber 47') is of a sufficiently high value to cause operation of motor 12 above a predetermined minimum speed, the piston consisting of enlarged portion 81 and packing 82 will be pulled downwardly against the bias of spring 83. This will cause spool valve 77 to assume its dotted line position. Therefore, the air requirements for compressor 32 will be obtained through venting aperture 54' in the valve housing, and this air will pass through the portion of bore 76 between enlargements 78 and 79 of spool valve 77 into conduit 57' leading to the intake side of the compressor. The compressed air produced by the compressor will flow through compressor discharge conduit 42' into tank 37 (FIG. 1) through the portion of the bore in valve 38' which is between enlarged portions 79 and 80 of the spool valve 78, and through conduit 44'. It will, of course, be appreciated that if the compressed air tank 37 is full, there will be no movement of compressed air in the above described path when there is sufficient manifold vacuum to cause wiper motor 12 to operate.

If the manifold vacuum should drop to a value which will not maintain operation of motor 12 above a predetermined minimum speed, this reduction in manifold vacuum will be sensed in chamber 47' of valve 38', and spring 83 will expand to cause spool valve 77 to return to its solid line position shown in FIG. 6. Under these circumstances, motor 12 will be evacuated through conduit 65', the portion of bore 76 which is between enlarged portions 78 and 79 of spool valve 77, and conduit 57'. The compressor exhaust will be transmitted through conduit 42' and the portion of chamber 76 which is between enlarged portions 79 and 80 of spool valve 77, and through conduit 54' in valve 38' to the atmosphere. As noted above, this dumping action of compressed air to the atmosphere is necessary when compressed air tank 37 is full to permit the compressor 32 to evacuate motor 12.

It will thus be seen that a vacuum operated windshield wiper system has been disclosed in which a fluid pressure motor is operated by manifold vacuum when the latter is of a sufficiently high value to cause the motor to provide a predetermined speed output. On the other hand, when the manifold vacuum drops, as during vehicle acceleration, the suction side of the compressor within the vehicle is coupled to the fluid pressure wiper motor, and the vacuum thus produced drives the motor at a satisfactory speed.

While a preferred embodiment of the foregoing invention has been disclosed, it is to be understood that the present invention is not limited thereto, but may be otherwise embodied within the scope of the following claims.

What is claimed is:

1. In combination in a vehicle having a compressor therein for supplying compressed air for operating accessories, a windshield wiper system comprising a windshield wiper, a wiper motor for driving said wiper, a source of vacuum for providing energy for driving said wiper motor in a first range of operating speeds, and control means for operatively coupling the intake side of said compressor to said wiper motor when the vacuum in said source falls to a value which would cause said wiper motor to operate in a second range of speeds which is lower than said first range of speeds, whereby the air pumping characteristic of said compressor is selectively utilized to provide a second source of vacuum for operation of said wiper motor.

2. In combination in a vehicle having a compressor therein for supplying compressed air for operating accessories, a windshield wiper system comprising a windshield wiper, a windshield wiper motor for driving said windshield wiper, a source of vacuum for providing energy for driving said wiper motor in a first range of speeds, and control means for causing the vacuum produced by the intake side of said compressor to communicate with said wiper motor when the vacuum in said source falls to a value which would cause said wiper motor to operate in a second range of speeds which is lower than said first range of speeds.

3. In combination in a vehicle having a compressor therein for supplying compressed air for operating accessories, a windshield cleaning system comprising a windshield wiper, a wiper motor for driving said wiper, a source of vacuum for providing energy for driving said wiper motor in a first range of speeds, and control means for substituting the vacuum created by the intake side of said compressor for said source of vacuum when a decrease in vacuum at said source would cause said wiper motor to operate in a second range of speeds which is lower than said first range of speeds.

4. In combination in a vehicle having a compressor therein for supplying compressed air for operating accessories, a windshield wiper system comprising a windshield wiper, a fluid pressure windshield wiper motor for driving said wiper, a source of fluid pressure for providing energy for driving said wiper motor in its higher ranges of operating speed, and control means for coupling the intake side of said compressor to said motor when a change in the fluid pressure at said source would cause the motor to operate in a lower range of speed.

5. In combination in a vehicle having a compressor therein for supplying compressed air for operating accessories, a windshield wiper system comprising a windshield wiper, a wiper motor for driving said wiper, and means for operatively coupling the intake side of said compressor to said wiper motor whereby the vacuum produced by said compressor operates said motor.

6. In combination with an automotive vehicle having an engine therein, a windshield wiper, a wiper motor for driving said wiper, a source of vacuum for providing energy for driving said motor during part of its operation, a compressor for supplying compressed air for operation of automotive accessories, and automatic control means for operatively coupling the intake side of said compressor to said wiper motor during part of the operation of said wiper motor.

7. In combination with an automotive vehicle having an engine therein, a windshield cleaning system comprising a wiper, a wiper motor for driving said wiper, an intake manifold associated with said engine, means for causing communication between said intake manifold and said wiper motor whereby the vacuums within a first range of values in said intake manifold will serve to drive said wiper motor, a compressor in said vehicle for providing compressed air for operation of automotive accessories, and control means for causing selective communication between the intake side of said compressor and said wiper motor whereby the vacuum produced by said compressor will communicate with said wiper motor to serve as its source of operating energy whenever the vacuums in said manifold fall within a second range of values which are lower than said first range of values.

8. A windshield cleaning system as set forth in claim 7 including means operatively coupled to said compressor for causing compressor operation in response to vehicle engine operation, a storage tank for storing compressed air produced by said compressor, and air intake means controlled by said control means for supplying air to said compressor through a path which does not include the working parts of said wiper motor when said wiper motor is driven by said manifold vacuum.

9. A system as set forth in claim 8 including means for causing the air compressed by said compressor to be shunted from its delivery to said storage tank in the event that said storage tank is full.

10. A windshield cleaning system as set forth in claim 9 including air supply means for said compressor associated with a non-working part of said wiper motor to permit the air requirements for said compressor to be obtained therethrough when said motor is not in operation and when said air intake means are closed.

11. A windshield wiper system comprising a windshield wiper, a wiper motor for driving said wiper, a source of vacuum for driving said motor in a first range of speeds, a compressor for providing compressed air for operating accessories, a storage tank for compressed air, control means for operatively coupling the intake side of said compressor to said motor when a change in the vacuum in said source would normally cause said wiper motor to operate in a second range of speeds which is lower than said first range of speeds, and means operatively associated with said control means for causing at least a portion of the output of said compressor to be conducted to said storage tank when said wiper motor is in operation and when said storage tank does not contain its full capacity of compressed air.

12. In combination in a vehicle having a compressor therein for supplying compressed air for operating accessories, a windshield wiper system comprising a windshield wiper, a fluid pressure windshield wiper motor for driving said windshield wiper, a source of fluid pressure for providing energy for driving said wiper motor when the fluid pressure at said source is within a first range of values, and control means for causing communication between the intake side of said compressor and said wiper motor when the fluid pressure at said source is within a second range of values which is lower than said first range of values, whereby the air pumping characteristic of said compressor is selectively utilized to provide a second source of vacuum for operation of said wiper motor.

13. In combination with a vehicle having an engine therein, a windshield wiping system comprising a windshield wiper, a vacuum wiper motor for driving said wiper, an intake manifold associated with said engine, means for causing communication between said intake manifold and said wiper motor whereby the vacuum within a first range of values in said intake manifold will serve to drive said wiper motor, a compressor for supplying compressed air for operation of accessories in said vehicle, control means for causing selective communication between the intake side of said compressor and saisd wiper motor whereby the vacuum produced by said compressor will serve as the source of operating energy for said wiper motor whenever the vacuums in said intake manifold fall within a second range of values which is lower than said first range of values, and valve means for preventing communication between the intake side of said compressor and said intake manifold.

References Cited in the file of this patent

UNITED STATES PATENTS

| | | |
|---|---|---|
| 2,021,857 | Hueber | Nov. 19, 1935 |
| 2,130,957 | Kingsley | Sept. 20, 1938 |
| 2,520,650 | Oishei et al. | Aug. 29, 1950 |